(12) United States Patent
D'Urso et al.

(10) Patent No.: US 10,710,693 B2
(45) Date of Patent: Jul. 14, 2020

(54) FUEL TANK ARRANGEMENT OF A MARINE VESSEL AND METHOD OF OPERATING A TANK CONTAINER OF A MARINE VESSEL

(71) Applicant: WARTSILA FINLAND OY, Vaasa (FI)

(72) Inventors: Emanuele D'Urso, Trieste (IT); Giammario Meloni, Trieste (IT); Piero Zoglia, Trieste (IT); Yves Bui, Trieste (IT); Pasquale Tripodi, Rome (IT); Vincenzo Bosco, Rome (IT)

(73) Assignee: WÄRTSILÄ FINLAND OY, Vaasa (FI)

( * ) Notice: Subject to any disclaimer, the term of this patent is extended or adjusted under 35 U.S.C. 154(b) by 298 days.

(21) Appl. No.: 15/313,783

(22) PCT Filed: May 30, 2014

(86) PCT No.: PCT/FI2014/050431
§ 371 (c)(1),
(2) Date: Nov. 23, 2016

(87) PCT Pub. No.: WO2015/181436
PCT Pub. Date: Dec. 3, 2015

(65) Prior Publication Data
US 2017/0183072 A1 Jun. 29, 2017

(51) Int. Cl.
*F02M 21/02* (2006.01)
*B63H 21/38* (2006.01)
*F17C 1/00* (2006.01)
*F17C 13/06* (2006.01)

(52) U.S. Cl.
CPC ......... *B63H 21/38* (2013.01); *F02M 21/0212* (2013.01); *F02M 21/0221* (2013.01);
(Continued)

(58) Field of Classification Search
CPC ............... B63H 21/38; F02M 21/0212; F02M 21/0221; F02M 21/0245; F17C 1/002;
(Continued)

(56) References Cited

U.S. PATENT DOCUMENTS 2,017,841 A * 10/1935 Coleman .............. A62C 35/605
137/551
2,600,015 A * 6/1952 McLaughlin .......... B63B 25/14
114/74 A
(Continued)

FOREIGN PATENT DOCUMENTS

EP 2032428 B1 3/2009
KR 100 978 066 B1 8/2010

OTHER PUBLICATIONS

International Search Report for International Application No. PCT/FI2014/050431, dated Nov. 10, 2014.
(Continued)

*Primary Examiner* — Craig J Price
(74) *Attorney, Agent, or Firm* — Heslin Rothenberg Farley & Mesiti P.C.; Victor A. Cardona, Esq.

(57) ABSTRACT

A fuel tank arrangement in a marine vessel has a tank container, a first fuel line having a first fuel line port opening into the tank container so as to provide a flow path exclusively for a first fuel, a second fuel line having a second fuel line port opening into the tank container so as to provide a flow path exclusively for a second fuel. The first fuel line port and/or the second fuel line port is provided with a plug or alike to close the flow path from the tank container into the fuel line.

20 Claims, 3 Drawing Sheets

(52) U.S. Cl.
CPC ......... *F02M 21/0245* (2013.01); *F17C 1/002* (2013.01); *F17C 13/06* (2013.01); *F17C 2201/0109* (2013.01); *F17C 2221/033* (2013.01); *F17C 2223/013* (2013.01); *F17C 2223/033* (2013.01); *F17C 2265/061* (2013.01); *F17C 2265/066* (2013.01); *F17C 2270/0105* (2013.01); *Y02T 10/32* (2013.01); *Y02T 70/5209* (2013.01); *Y02T 90/46* (2013.01)

(58) Field of Classification Search
CPC .............. F17C 13/06; F17C 2201/0109; F17C 2221/033; F17C 2223/013; F17C 2223/033; F17C 2265/061; F17C 2265/066; F17C 2270/0105; Y10T 137/0318–053; Y10T 137/85954; Y10T 137/86187–86372; Y10T 137/87249; Y10T 70/5209; Y02T 10/32; Y02T 90/46; B63B 2770/00
USPC ................ 137/255–267, 571–592, 597, 563; 123/57 GE; 62/240; 440/88 F
See application file for complete search history.

(56) References Cited

U.S. PATENT DOCUMENTS

| | | | | |
|---|---|---|---|---|
| 2,767,691 | A * | 10/1956 | Mengelkamp | F02B 7/00 123/1 A |
| 2,940,268 | A * | 6/1960 | Morrison | C10G 5/06 62/240 |
| 2,940,435 | A * | 6/1960 | Nemec | F02D 19/0684 123/575 |
| 3,159,345 | A * | 12/1964 | Osburn, Jr. | F23N 1/007 236/26 R |
| 3,409,040 | A * | 11/1968 | Weston | B63H 21/38 137/572 |
| 3,565,201 | A * | 2/1971 | Petsinger | B60K 15/013 180/69.5 |
| 3,577,877 | A * | 5/1971 | Warne | F02C 9/40 123/526 |
| 3,766,734 | A * | 10/1973 | Jones | F02C 9/40 60/39.281 |
| 4,129,146 | A * | 12/1978 | Schuler | F17C 5/02 137/587 |
| 4,416,244 | A * | 11/1983 | McDonald | F02D 19/0647 123/27 GE |
| 4,520,766 | A * | 6/1985 | Akeroyd | F02D 19/0647 123/27 GE |
| 4,606,322 | A * | 8/1986 | Reid | F02D 19/0684 123/458 |
| 4,619,240 | A * | 10/1986 | Bedford | B26D 3/006 123/27 GE |
| 4,951,699 | A * | 8/1990 | Lipman | B60K 15/077 137/142 |
| 5,092,305 | A * | 3/1992 | King | F02D 19/0631 123/1 A |
| 5,370,097 | A * | 12/1994 | Davis | F02D 19/0631 123/27 GE |
| 5,979,485 | A * | 11/1999 | Tuckey | B60K 15/061 123/510 |
| 6,035,837 | A * | 3/2000 | Cohen | F02D 19/0628 123/27 GE |
| 6,244,917 | B1 * | 6/2001 | Hartke | B63H 21/38 123/468 |
| 6,276,387 | B1 * | 8/2001 | Pachciarz | B60K 15/035 123/516 |
| 6,382,225 | B1 * | 5/2002 | Tipton | B60K 15/00 123/514 |
| 6,513,505 | B2 * | 2/2003 | Watanabe | F02D 19/12 123/25 R |
| 6,957,658 | B2 * | 10/2005 | Aschoff | B60K 15/035 137/202 |
| 7,114,342 | B2 * | 10/2006 | Oldham | F17C 13/025 62/48.1 |
| 7,318,445 | B2 * | 1/2008 | Ohshiro | B60K 15/035 137/202 |
| 7,438,012 | B2 * | 10/2008 | Kackur | B63J 99/00 114/74 A |
| 7,520,293 | B2 * | 4/2009 | Hilderley | B60K 15/035 137/202 |
| 8,220,439 | B2 * | 7/2012 | Fisher | F02D 19/0647 123/304 |
| 8,591,273 | B2 * | 11/2013 | Nylund | B63B 25/12 114/74 A |
| 8,622,074 | B2 * | 1/2014 | Hochstein | B60K 15/03519 137/202 |
| 8,807,162 | B2 * | 8/2014 | Monterrey | B63H 21/38 137/202 |
| 8,905,006 | B2 * | 12/2014 | Jaasma | F02D 19/0647 123/525 |
| 8,973,560 | B2 * | 3/2015 | Krug | F02M 37/0088 123/1 A |
| 9,206,776 | B2 * | 12/2015 | Bui | B63H 21/12 |
| 9,279,372 | B2 * | 3/2016 | Monros | F02B 43/00 |
| 9,447,751 | B2 * | 9/2016 | Lee | F02M 21/0224 |
| 9,695,764 | B1 * | 7/2017 | Christiansen | F02D 41/0025 |
| 9,751,606 | B2 * | 9/2017 | Lee | F04B 23/025 |
| 9,765,707 | B2 * | 9/2017 | Krug | F02D 19/0628 |
| 9,988,990 | B2 * | 6/2018 | Bhatt | F02D 19/0615 |
| 10,088,108 | B2 * | 10/2018 | Jansson | F17C 5/02 |
| 2004/0111210 | A1 * | 6/2004 | Davis | F02D 19/027 701/103 |
| 2005/0087236 | A1 * | 4/2005 | Woo | B60K 15/03 137/572 |
| 2006/0053806 | A1 * | 3/2006 | Tassel | B63B 25/16 62/48.1 |
| 2006/0086412 | A1 * | 4/2006 | Spittael | B63J 99/00 141/387 |
| 2007/0051114 | A1 * | 3/2007 | Mahlanen | B63J 99/00 62/50.1 |
| 2007/0175459 | A1 * | 8/2007 | Williams | F02D 19/0605 123/575 |
| 2008/0245350 | A1 * | 10/2008 | Triska | F02M 37/0064 123/575 |
| 2009/0050383 | A1 * | 2/2009 | Brigham | B60K 6/32 180/65.8 |
| 2009/0239426 | A1 * | 9/2009 | Levander | B63B 25/12 440/88 F |
| 2010/0126468 | A1 * | 5/2010 | Martin | F02D 19/0647 123/447 |
| 2011/0168132 | A1 * | 7/2011 | Pursifull | F02M 43/00 123/446 |
| 2011/0179810 | A1 * | 7/2011 | Sipila | B63B 27/24 62/53.2 |
| 2011/0314839 | A1 * | 12/2011 | Brook | F02M 21/06 62/49.1 |
| 2012/0004824 | A1 * | 1/2012 | Milton | F02B 7/06 701/103 |
| 2013/0269633 | A1 * | 10/2013 | Bui | B63H 21/12 123/3 |
| 2015/0075623 | A1 * | 3/2015 | Tokumaru | F02M 21/0221 137/1 |
| 2015/0135733 | A1 * | 5/2015 | Nettis | F17C 1/06 62/53.2 |
| 2015/0158617 | A1 * | 6/2015 | Ehrmann | B65C 1/00 156/64 |
| 2016/0039511 | A1 * | 2/2016 | Kadobayashi | B63H 21/38 123/429 |

OTHER PUBLICATIONS

Patent Cooperation Treaty, Notification concerning transmittal the International Preliminary Report on Patentability for International Application No. PCT/FI2014/050431, dated Dec. 15, 2016, 9 pages.

* cited by examiner

FUEL TANK ARRANGEMENT OF A MARINE VESSEL AND METHOD OF OPERATING A TANK CONTAINER OF A MARINE VESSEL

CROSS REFERENCE TO RELATED APPLICATIONS

This application is a national stage of PCT International Application No. PCT/FI2014/050431, filed on May 30, 2014, and published in English on Dec. 3, 2015, as WO 2015/181436 A1, the entire disclosure of this application being hereby incorporated herein by reference.

TECHNICAL FIELD

The present invention relates to a fuel tank arrangement in a marine vessel. More particularly, the present invention is related to a fuel tank arrangement in a marine vessel comprising a tank container, a first fuel line comprising a first fuel line port opening into the tank container, a second fuel line comprising a second fuel line port opening into the tank container.

Invention relates also to a method of operating a tank container of a marine vessel in which method the fuel contained by the tank container is changed from a first fuel to a second fuel.

BACKGROUND ART

Gas is becoming more and more attractive fuel for ships' and other marine vessels' prime movers and auxiliary engines. Particularly but not exclusively natural gas (NG) is feasible due to its availability. Natural gas is a gaseous mixture in the ambient circumstances consisting primarily of methane and small amounts of ethane, propane, butane and nitrogen. It has high hydrogen content relative to coal, so when combusted it provides inter alia low amount of emissions, very clean burning process and it is basically free of contaminants. Particularly in cruise vessels, ferries and so called ro-pax vessels, where passengers are on board, the absence of soot emissions and visible smoke in the exhaust gases of ship's engines is very important feature facilitated by using NG as fuel for the engines but also for vessels carrying goods and bulk materials. Usually natural gas is stored as liquefied natural gas (LNG) at temperature of about $-162°$ C., thus the storage cause problems due to the requirements to provide effective insulation. Additional problem is caused if the LNG is stored at high pressure, about at 5-6 bar but also more if needed, which is typically the level that a gas operated piston engine requires.

EP2032428 B1 discloses a fuel system for gas driven piston engine in a marine vessel, which gas is stored at least one fuel storage tank in the vessel as liquefied gas. A separate fuel feed tank in which the gas is in liquid phase and at elevated pressure and separate fuel storage tank or tanks in which the gas is also in liquid phase. Since the liquefied gas is at low temperature the tanks are heat insulated.

Generally, in sake of increased redundancy the possibility of changing the used fuel in the vessel is a desired feature. Liquefied natural gas tanks are not suitable for store or contain any other fuels than gaseous fuels like the liquefied natural gas. For example, because of the double wall vacuum insulation an interior of a common LNG tank cannot be accessed and therefore cannot be cleaned inside.

An object of the invention is to provide a fuel tank arrangement in a marine vessel and a method of operating a tank container wherein different types of fuels are used in a same tank container and thus not replacing the tank container, and the arrangement in which the performance is considerably improved compared to the prior art solutions.

DISCLOSURE OF THE INVENTION

Object of the invention is substantially met by a fuel tank arrangement of a marine vessel comprising a tank container, a first fuel line comprising a first fuel line port opening into the tank container so as to provide a flow path exclusively for a first fuel, a second fuel line comprising a second fuel line port opening into the tank container so as to provide a flow path exclusively for a second fuel, in which one of the first fuel line port and the second fuel line port is provided with a closing means inside the tank container so as to close the flow path from the tank container into the fuel line.

Advantageously, this provides the fuel tank arrangement in the marine vessel wherein different types of fuels are used in the same tank container and thus there is no need for replacing the tank container. This provides the liquefied natural gas tank arrangement which is suitable for storing or containing also liquid fuels.

According to an embodiment of the invention, when in an operational use the first fuel is liquefied gas. According to an embodiment of the invention, the first fuel is liquefied natural gas (LNG). This sets stringent requirements for the tank container design which are advantageously met by the tank arrangement according to the invention. Therefore, in an embodiment of the invention, the tank container is arranged to endure internal pressure above the atmospheric pressure and the tank container is provided with heat insulation.

According to an embodiment of the invention, when in an operational use the second fuel is oil based liquid fuel. The second fuel may be, for instance, marine diesel oil. According to an embodiment of the invention, when in operational use the second fuel is marine gas oil. According to an embodiment of the invention, the second fuel may be a light fuel oil, heavy fuel oil, intermediate fuel oil or marine diesel oil.

According to an embodiment of the invention, the first fuel line can be arranged in flow communication with a filling system in order to bunker that tank container. The first fuel line can comprise a feed line that has at least two branches, a first one of which extends to the tank container via the first fuel line that has its port at the vicinity of the bottom of the tank container and a second one is a spray branch with spray nozzles extending to the tank container and having a port at the vicinity of the top of the tank container. The port comprises a plurality of spray nozzles which makes the liquefied gas atomizing into small when it is introduced into the tank container through the nozzles.

According to an embodiment of the invention, the first fuel line is arranged in flow communication with the spray nozzles arranged in the upper portion of the tank container.

According to an embodiment, the spray nozzles are provided with closing means. Thus the closing means of the spray nozzles cover and prevent the nozzles from dirt from the second fuel or simply prevent the nozzles from the second fuel. Namely, the second fuel may not be as pure as the first fuel and therefore the nozzles need to be closed by the closing means when using the second fuel.

According to an embodiment of the invention, the tank container is provided with a pressure build up system comprising a conduit being in flow communication via the first fuel line from the bottom section of the tank container to the upper section of the tank container and an evaporator arranged to the conduit.

According to an embodiment of the invention, the conduit is provided with a closing means so as to close the flow communication from the tank container into the conduit.

According to an embodiment of the invention, the second fuel line port is arranged in a lower portion of the tank container.

According to an embodiment of the invention, the first fuel line port is arranged in a lower portion of the tank container.

According to an embodiment of the invention, the tank container is provided with a manhole. Therefore, the tank container can be easily cleaned via the manhole. In addition, the closing means can be assembled into the port of the first fuel line or into the port of the second fuel line, into the nozzles and into the conduit inside the tank container. In case the first fuel is consumed or removed from tank container and the assembly is changed to be suitable for the operation of using the second fuel, the manhole is opened and the tank container may be cleaned inside. It should be noted that in case the first fuel is liquefied natural gas which is substantially clean fuel, the tank container may not be needed to clean it when changing the operation of using the second fuel. Then the closing means is taken out from the port of the second fuel line and the closing means are arranged into the port of the first fuel line and possibly also on the nozzles and into the conduit. Therefore, the second fuel is not allowed to flow into the first fuel line.

After cleaning, closing the first fuel line and opening the second fuel line by removing closing means, the manhole can be closed. Then the second fuel is introduced into the tank container. Then the second fuel can be introduced into the engine so as to operate the engine using the second fuel. Similarly, in case the second fuel is consumed or the tank container is emptied and an operation is changed to the operation of using the first fuel, the manhole is opened and the tank container is cleaned inside.

In case the second fuel is petroleum based fuel and the first fuel is liquefied natural gas, the tank container needs to be thoroughly cleaned before introducing the first fuel into the tank container due to the fact that the petroleum based fuel is not as clean as the liquefied natural gas. Then the closing means are taken out from the port of the first fuel line and possibly also from the nozzles and from the conduit and then the closing means are arranged into the port of the second fuel line. Therefore, the first fuel is not allowed to flow into the second fuel line. After cleaning, closing the second fuel line and opening the first fuel line, the manhole can be closed. Then the first fuel is introduced into the tank container. Then the first fuel can be introduced into the engine so as to operate the engine using the first fuel.

According to an embodiment of the invention, when in an operational use and tank container containing the first fuel, the first fuel line port is arranged open into the container for introduction the fuel from the tank container into the engine and the closing means is arranged into the port of the second fuel line. When in the operational use and tank container containing the first fuel, the first fuel line is in flow communication with the spray nozzles arranged in an upper portion of the tank container. Using the closing means to plug or close the port of second fuel line, the first fuel cannot damage the second fuel line. Correspondingly, the second fuel line cannot introduce the second fuel or residues of the second fuel from the second fuel line into the tank container. Due to the fact that the first fuel and the second fuel are different in their properties, the first fuel line exclusively introduces the first fuel into the engine and the second fuel line exclusively introduces the second into the engine. According to an embodiment of the invention, the first fuel needs be treated differently than the second fuel before introducing into the engine. For instance, natural gas is stored as liquefied natural gas (LNG) at temperature of about −162° C.

According to an embodiment of the invention, when the tank container contains the first fuel that is liquefied natural gas, the tank container includes a liquefied gas space and a vaporized gas space at the upper part of the tank container's inner space.

According to an embodiment of the invention, when in an operational use and tank container containing the first fuel, the tank container is provided with a pressure build up system comprising the conduit being in flow communication via the first fuel line from the bottom section of the tank container to the upper section of the tank container and an evaporator arranged to a port of the conduit and a closing means is arranged into the conduit.

According to an embodiment of the invention, when in an operational use and tank container containing the second fuel, the second fuel line port is arranged open into the container for introduction the fuel from the tank container into the engine and the closing means are arranged into the port of the first fuel line. According to an embodiment, when the tank containing the second fuel, the closing means are arranged into the spray nozzles or all or a number of the spray nozzles are replaced by the closing means and a closing means is arranged into a port of the conduit.

According to an embodiment of the invention, each of the closing means is a plug or alike.

According to an embodiment of the invention, the closing means corresponding threads in the first opening has a threaded structure and the closing means corresponding threads in the second opening has a threaded structure so as to close the flow communication from the tank container into the engine. Advantageously, the closing means of the fuel lines meet the stringent standards of the LNG tank container.

According to an embodiment of the invention, the tank container is arranged operable in cryogenic conditions.

Object of the invention is also met by a method operating a tank container of a marine vessel in which method the fuel contained by the tank container is changed from a first fuel to a second fuel, the method comprising at least steps of:

a) Emptying the tank container from the first fuel,
b) Opening a manhole of the tank container,
c) Closing or maintaining closed a port of a first fuel line with a closing means inside the tank container,
d) Removing a closing means from or maintaining open a port of a second fuel line inside the tank container,
e) Closing the manhole,
f) Feeding a second fuel from a second filling system into the tank container,
g) Feeding the second fuel from the tank container via the second fuel line into the engine.

According to a preferred embodiment of the invention the method comprises a further step of cleaning the internal surfaces of the tank container.

According to a preferred embodiment of the invention the method comprises According to a preferred embodiment of the invention the cleaning the tank container optionally means that the tank container is cleaned if the preceding fuel is liquid petroleum based fuel and the prospective fuel is liquefied gas.

In this connection the term port means one or more ports. Furthermore, the tank container may preferably be a storage tank for storing fuel therein or a containing tank containing fuel used in a marine vessel.

BRIEF DESCRIPTION OF DRAWINGS

In the following, the invention will be described with reference to the accompanying exemplary, schematic drawings, in which.

DETAILED DESCRIPTION OF DRAWINGS

Figure 1:
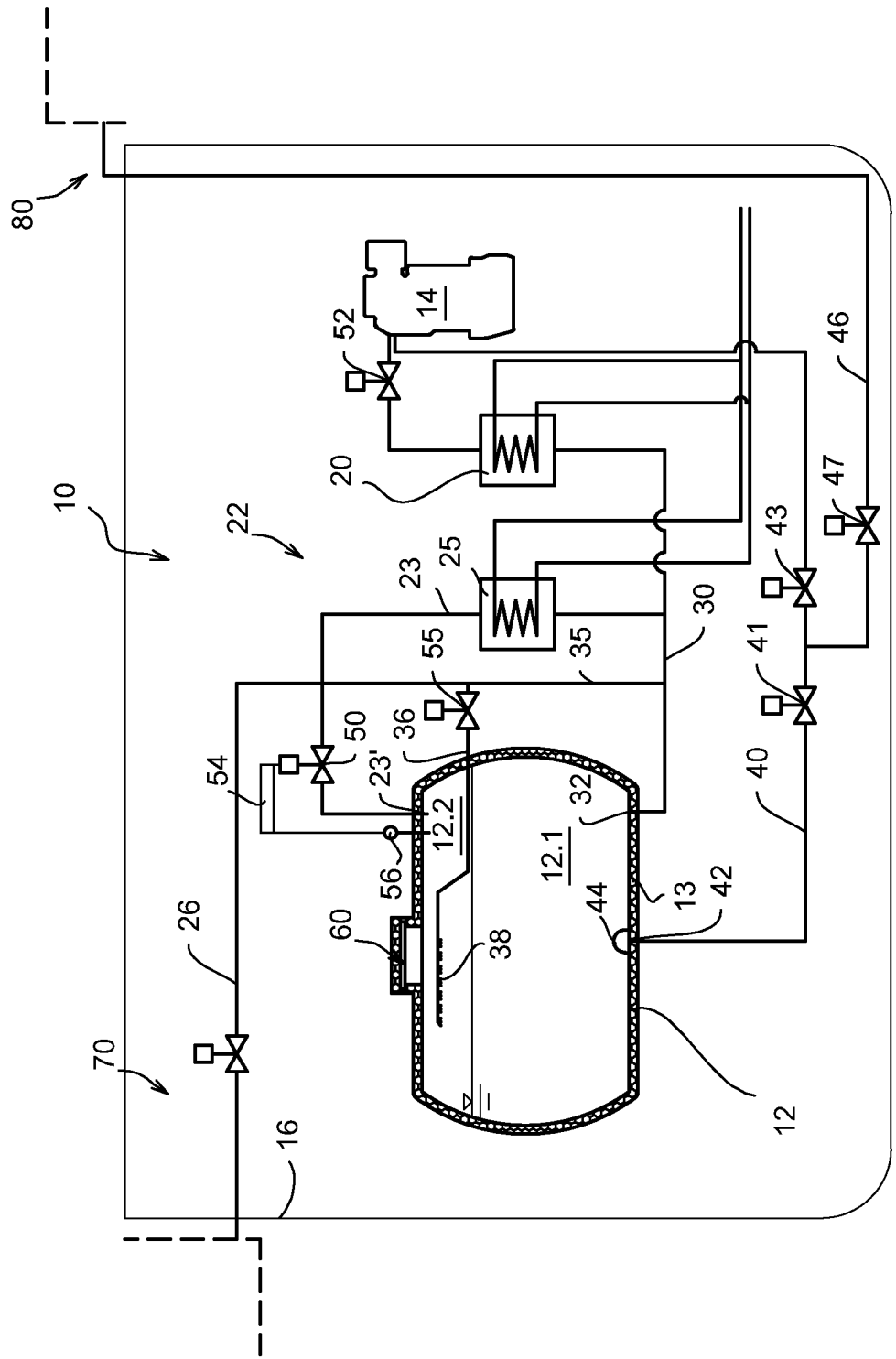
FIG. 1 illustrates a fuel tank arrangement 10 in a marine vessel 16 according to an embodiment of the invention.

FIG. 1 describes an embodiment of a fuel tank arrangement 10 in a marine vessel 16 according to the invention. The fuel tank arrangement 10 in the marine vessel 16 comprises a tank container 12, a first fuel line 30 and a second fuel line 40. The first fuel line 30 comprises a first fuel line port 32 opening into the tank container so as to provide a flow path exclusively for a first fuel. The second fuel line 40, respectively, comprises a second fuel line port 42 opening into the tank container so as to provide a flow path exclusively for a second fuel. The second fuel line port 42 and the first fuel line port 32 are arranged to open into a lower portion of the tank container 12 to receive fuel near the bottom of the tank container 12.

The marine vessel is provided with an engine 14. The engine may be operated making use of the fuel stored in the fuel tank arrangement 10. In this embodiment, the fuel tank arrangement 10 relates to an operational assembly wherein the fuel tank container 12 comprises the first fuel that is a liquefied gas fuel where major part of the fuel is in liquid phase and a part is in gaseous form. The second fuel line port 42 is provided with a closing means 44 so as to close the flow path from the tank container 12 into the second fuel line 40. Advantageously, the closing means 44 of the port 42 of the second fuel line 40 can be a plug or alike and can comprise a threaded structure corresponding threads in the port 42 of the second fuel line 40. As can be seen in FIG. 1, the closing means 44 corresponding to the port 42 of the second fuel line 40 are arranged inside the tank container 12 so as to close the flow communication from the tank container 12 into the second fuel line 40. Thus each of the ports in the tank container 12 is provided with secure attaching means for the closing means. This is shown in more detailed manner in FIG. 3. It should be noted that the closing means 44 of the second fuel line 40 needs to meet high standards and the closing should be specifically tight so as to protect the second fuel line 40 from the first fuel to entering in the second fuel line 40.

FIG. 1 is related to an operational assembly, when the tank arrangement 10 is in an operational use and tank container 12 is containing the first fuel. The first fuel line port 32 is arranged open into the tank container 12 for receiving the fuel and further for introduction of the first fuel from the tank container 12 into the engine 14. In this operational assembly the closing means 44 of the second fuel line 40 are arranged into the port 42 of the second fuel line 40.

Namely, the first fuel used in this embodiment is particularly liquefied natural gas, and it is stored in the tank container 12 at considerably low temperature, typically at temperature of about −162° C. which is described as cryogenic conditions. Typically the gas i.e. the first fuel fills the tank container so that a part of the gas is as liquefied gas at the bottom of the tank container 12.1, at liquefied gas space, and part as gaseous gas at the upper part 12.2 i.e. vaporized gas space of the tank container above the liquefied gas space. The tank arrangement 10 comprises a heat insulation 13 enclosing the actual tank container 12. The insulation may be for example a double wall vacuum insulation to prevent excessive heat transfer into the tank container and warming up of the LNG in the tank container.

In this exemplary embodiment the tank container 12 is connected via the first fuel line 30 with the engine 14. The first fuel line 30 can be provided with a valve 52 so as to control the fuel flow into the engine 14. The first fuel line 30 is provided with an evaporator 20 by means of which liquefied gas may be evaporated as it is consumed prior to feeding to the engine, according to the demand. This evaporator is called a main evaporator because during the operation of the engine the gas combusted in the engine is evaporated continuously while the liquefied gas in the tank container 12 is fed to the engine 14. The tank container 12 is also provided with a pressure build up system 22 by means of which the pressure in the tank container 12 may be maintained at a level which makes it possible to deliver fuel to the engine at required feed pressure even without mechanical pumping. The pressure build up system 22 comprises a conduit 23 being in flow communication from the bottom section of the tank container 12 via the first fuel line 30 to the upper section of the tank container 12 and an evaporator 25 arranged to the conduit 23. During the operation of the pressure build up system 22 the liquefied gas is turning into gaseous form in the evaporator 25 and is led to the upper part of the tank container 12. The evaporation process increases the pressure in the tank container 12. Pressure is detected by a sensor 56 which is in connection with a control unit 54. There is a valve 50 arranged to the conduit 23 by means of which the flow rate of the gas in the conduit 23 may be controlled. The operation of the valve 50 arranged to the conduit 23 is controlled by the control unit 54 arranged to control the fuel arrangement 10. Thus, the tank container 12 is arranged to endure internal pressure above the atmospheric pressure.

Since the engine consumes the fuel (either the first fuel or the second fuel), the tank container 12 must be filled occasionally. In order to fill the tank container 12 with the gas i.e. the first fuel, which is called also as bunkering, the tank arrangement 12 is provided with a filling system 70. The filling system 70 comprises a liquefied gas feed line 26 for bunkering operation. The feed line 26 has at least two branches, a first one 35 of which extends to the tank container 12 via the first fuel line 30 and has its port 32 opening at vicinity of the bottom of the tank container 12. Thus the first branch 35 of the feed line 26 is in flow communication with the first fuel line 30 that has the port 32 that opens below the surface of the liquefied gas in the tank container 12. A second branch 36 of the feed line 26, a spraying branch, extends to the tank container 12 as well, but is has its port 38 at the vicinity of the top of the tank container opening into the space of gaseous gas. The port 38 comprises a plurality of spray nozzles which makes the liquefied gas atomizing into small when it is introduced into the tank container 12 through the nozzles 38. The second branch 36 may be arranged with a valve member 55 to control the amount of sprayed liquefied gas. The filling system 70 may comprise also a vapour return line (not shown) connected to the top of the tank container opening into the vaporized gas space 12.2.

The tank arrangement 10 is provided with a manhole 60 providing an access into the inner space and surfaces of the tank container 12. This is necessary for maintenance and cleaning the tank container 12. In FIG. 1, the manhole 60 is arranged in the upper portion of the tank container 12. In case the fuel, for instance a liquefied gas fuel, is changed to another fuel, for instance a petroleum based fuel, the tank container 12 may need to be cleaned and the first fuel line 30 needs to be closed by the closing means 34 arranged into the port 32 of the first fuel feed line 30 as shown in FIG. 2.

Figure 2:
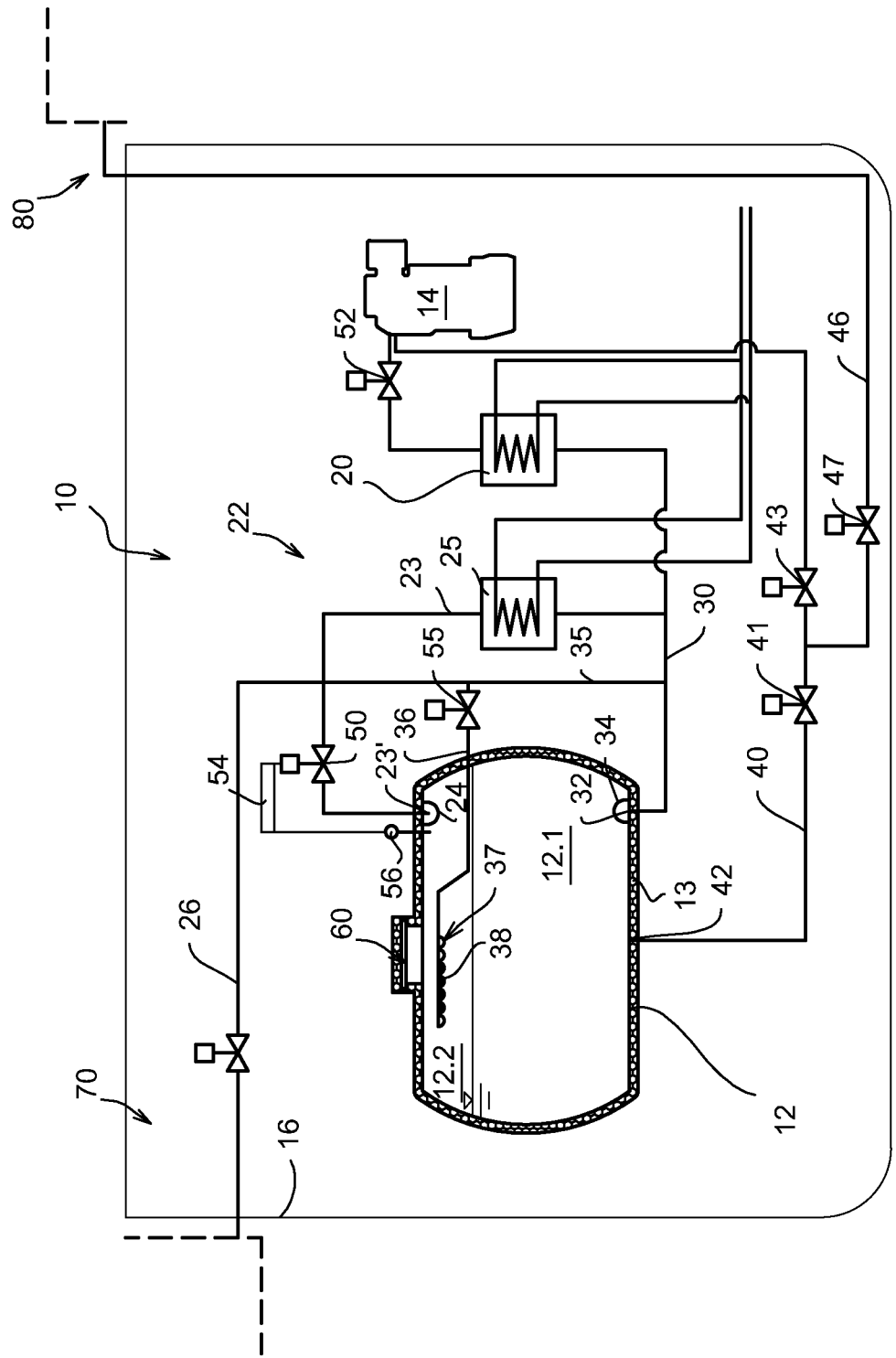
FIG. 2 illustrates a fuel tank arrangement 10 in a marine vessel 16 according to an embodiment of the invention.

Particularly, as shown in FIG. 2, also the spray nozzles 38 may be provided with closing means 37 and a port 23' of the conduit 23 opening into the upper portion of the tank container 12 may be provided with a closing means 24.

As an example, the first fuel is consumed in the engine so that the tank container 12 is empty. Now the operation of the engine 14 from a first fuel mode i.e. mode wherein only first fuel is used in the engine 14 is changed to a second fuel mode wherein only the second fuel is used in the engine 14. Due to the different fuel properties of the fuels, the tank container may be needed to be cleaned and it may also require other maintenance before introducing into the tank container the second fuel. As discussed earlier, in case the first fuel is liquefied natural gas which is substantially clean fuel, the tank container may not be needed to clean when changing the operation of using the second fuel. Therefore, the tank container 12 is arranged with the manhole 60 through which the maintenance and cleaning is possible. In this case, the operation of the engine 14 will be changed from feeding the first fuel via the first fuel line 30 into the engine 14 to the operation of feeding second fuel via the second fuel line 40 into the engine 14. Namely, after the tank container is cleaned, the spray nozzles 38 are covered or replaced by the closing means 37, the port 23' in the conduit 23 is closed with the closing means 24 and the first fuel line 30 is closed with the closing means 34. Thus all ports, lines and conduits wherein the first fuel is allowed to flow are closed by the closing means. Correspondingly, the second fuel line 40 needs to be opened by removing the closing means 44 from the port of the second fuel line 40. Then the tank container 12 can be filled with the second fuel. In this manner, the tank container 12 does not need to be replaced and the tank container 12 can contain different types of fuels. The first fuel may need to be stored in the tank container 12 at cryogenic conditions whereas the second fuel may not be need to be stored at cryogenic conditions. This is particularly the case, when the first fuel is liquefied natural gas and the second fuel is a petroleum based fuel.

FIG. 2 illustrates schematically an operational assembly wherein the first fuel line port 32 is closed by the closing means 34 and the tank container 12 is filled with or contains the second fuel. Particularly, in this embodiment, also the nozzles 38 are covered or replaced by the closing means 37 so as to prevent the second fuel from entering into the first fuel line. Also the conduit 23, particularly its port 23', is closed by the closing means 24. As illustrated in FIG. 2, the closing means 24, 34 and 37 are arranged inside the tank container 12. The closing means 24, 34 and 37 corresponding to the port 23' of the conduit 23, the port 32 of the first fuel line 30 and nozzles 38, respectively, can be arranged inside the tank container 12 via the manhole 60. The closing means 24, 34 and 37 may have a threaded structure. Therefore, the closing means 24, 34 and 37 can be screwed tightly into the port 32 of the first fuel line 30, into the port 23' of the conduit 23 opening into the tank container 12 as well as the nozzles 38, respectively. Therefore, the second fuel is prevented from flow communication with the first fuel line 30. Correspondingly, in the assembly shown in FIG. 2, the closing means 44 from the port 42 of the second fuel line 30 is removed. When in an operational use and tank container containing the second fuel, the second fuel line 40 port is arranged to open into the tank container 12 for introduction of the second fuel from the tank container 12 into the engine 14. Now the closing means 34 is arranged into the port 32 of the first fuel line 30.

Therefore and due to different properties of the first fuel and the second fuel, the first fuel is allowed to flow exclusively into the first fuel line 30 whereas the second fuel is allowed to flow exclusively into the second fuel line 40. In other words, the first fuel is not allowed to flow into the second fuel line 40 since the first fuel needs to be treated in a different manner before introducing the first fuel into the engine compared to the second fuel. Respectively, the second fuel is not allowed to flow into the first fuel line 30.

The second fuel can be advantageously, for instance, marine gas oil or marine diesel oil. It should be noted that the properties of the liquefied natural gas and marine diesel oil differ, for instance, in their densities.

Since the engine consumes the fuel (either the first fuel or the second fuel) the tank container must be filled occasionally. In order to fill the tank container with the second fuel (oil based fuel), the tank arrangement 12 is provided with a second filling system 80. The second filling system 80 comprises a second fuel feed line 46 for filling operation. The second fuel line may be arranged with a valve member 41 and a valve member 43. In other words, the second filling system 80 is arranged to feed the second fuel into the tank container 12 whereas in FIG. 1 the filling system 70 is arranged to feed the second fuel into the tank container 12. It should be noted that in FIG. 1 and in FIG. 2 two filling systems 70 and 80 are shown but only one filling system is in use and arranged to feed the fuel into the tank container 12 at a time. In other words, either the first fuel is introduced into the tank container 12 from the filling system 70 or the second fuel is introduced into the tank container from the second filling system 80. The second fuel feed line 46 may be arranged with a valve member 47 so as to open or close the flow communication from the second filling system 80 into the tank container 12. While the valve 47 of the second fuel feed line 46 is open, the valve member 43 arranged on the engine side can be closed so as to prevent the second fuel to flow into the engine. Correspondingly, the valve member 41 arranged on the tank container side in the second fuel feed line 46 is open so as to allow the second fuel from the second filling system 80 to flow into the tank container 12.

It should be noted that the closing means 24 of the port 23' of the conduit 23 prevents the second fuel to enter into the fuel feed line 26 of the first fuel as well. Correspondingly, the closing means 37 of the nozzles prevent the second fuel to enter into the fuel feed line 26 of the first fuel as well. The feed line 26 can be arranged also so that it is not in direct flow communication with the first fuel line 30 but it is connected directly into the tank container 12 with its own port (not shown) that needs to be provided with a closing means. Similarly, the closing means 44 in the port 42 of the second fuel line 40 prevents the first fuel to enter into the fuel feed line 46 of the second fuel. The feed line 46 of the second fuel can be arranged so that it is not in direct flow communication with the second fuel line 40 but it is connected into the tank container 12 with its own port (not shown) that needs to be provided with a closing means.

Even if not shown in the figure the invention may also be applied to a tank container operating at substantially atmospheric pressure and being equipped with cryogenic pumps capable of produce a pressure of 5-6 bar or more if needed. In addition to the combustion engine the gas may also be utilized in other kind of systems such as gas burning devices.

Figure 3:
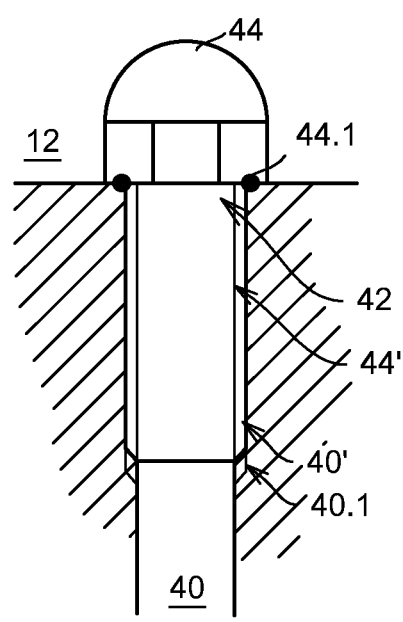
FIG. 3 illustrates a closing means according to an embodiment of the invention.

FIG. 3 illustrates schematically the closing means 44 shown here as assembled through a port of e.g. the second fuel line 40 into the second fuel line 40. The port is provided with a threaded 40' inner surface 40.1 corresponding to the threaded structure 44' of the closing means 44. Thus the closing means 44 can be advantageously screwed gas tightly through the port 42 into the second fuel line 40. Instead of a thread it is possible to use any suitable locking system by means of which the closing means may be fixed removably but securely to the port. The closing means 44 has a head 44' and a threaded pin part which pin part fits into the port and an edge of the head extending radially over the pin part is securing the connection.

In practice, the closing means 44 needs to fit tightly into the second fuel line 40. Therefore, the closing means 44 may be arranged with an additional sealing means such as a gasket or an O-ring 44.1.

The threaded structure shown in FIG. 3 can be also in the closing means 34 of the second fuel line 30, in the closing means 24 of the port 23' of the conduit 23 or in the closing means 37 of the nozzles 38. Therefore all closing means 24, 34, 37 and 44 may have substantially the same or similar threaded structure.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. It should be understood that the tank arrangement comprises several features which are not shown in figures for the sake of clarity, for example, the tank arrangement may comprise a vapour return line of the tank container filling system and/or a safety release valve line of the tank container tank container. Furthermore, it should be noted that a marine vessel may comprise more than one tank containers. Actual structure of the tank container may vary according to the actual application. The tank container may be provided with single shell, or double shell or membrane. The details mentioned in connection with any embodiment above may be used in connection with another embodiment when such combination is technically feasible.

The invention claimed is:

1. A fuel tank arrangement of a marine vessel comprising:
   a tank container configured to store or contain a first fuel or a second fuel in the tank container, a first fuel line comprising a first fuel line port opening into the tank container so as to provide a flow path exclusively for the first fuel, and
   a second fuel line comprising a second fuel line port opening into the tank container so as to provide a flow path exclusively for the second fuel, in which the second fuel line port is provided with a closing means inside the tank container so as to close the flow path from the tank container into the fuel line, and the second fuel line port and the first fuel line port arranged to open into a lower portion of the tank container to receive fuel near a bottom of the tank container, wherein the first fuel line port is arranged to open into the container for introduction of the fuel from the tank container into an engine and the closing means are arranged into the port of the second fuel line.

2. A fuel tank arrangement according to claim 1, wherein the first fuel line is arranged in flow communication with spray nozzles arranged in an upper portion of the tank container.

3. A fuel tank arrangement according to claim 2, wherein the spray nozzles are provided with closing means.

4. A fuel tank arrangement according to claim 1, wherein the tank container is provided with a pressure build up system comprising a conduit being in flow communication via the first fuel line from a bottom section of the tank container to an upper section of the tank container and an evaporator arranged to the conduit.

5. A fuel tank arrangement according to claim 4, wherein the conduit is provided with a closing means.

6. A fuel tank arrangement according to claim 1, wherein the second fuel line port is arranged in a lower portion of the tank container.

7. A fuel tank arrangement according to claim 1, wherein the first fuel line port is arranged in a lower portion of the tank container.

8. A fuel tank arrangement according to claim 1, wherein the tank container is provided with a manhole.

9. A fuel tank arrangement according to claim 1, wherein the first fuel line is in flow communication with spray nozzles arranged in an upper portion of the tank container.

10. A fuel tank arrangement according to claim 1, wherein the tank container is provided with a pressure build up system comprising a conduit being in flow communication via the first fuel line from a bottom section of the tank container to an upper section of the tank container and an evaporator arranged to the conduit.

11. A fuel tank arrangement according to claim 1, wherein when in an operational use the first fuel is liquefied gas and the second fuel that is oil based liquid fuel such as marine diesel oil.

12. A fuel tank arrangement according to claim 1, wherein each of the closing means is a plug.

13. A fuel tank arrangement according to claim 1, wherein the tank container is arranged operable in cryogenic conditions.

14. A method for operating a fuel tank arrangement of a marine vessel comprising a tank container configured to store or contain a first fuel or a second fuel in the tank container, a first fuel line comprising a first fuel line port opening into the tank container so as to provide a flow path exclusively for a first fuel, and a second fuel line comprising a second fuel line port opening into the tank container so as to provide a flow path exclusively for a second fuel, in which the first fuel line port or the second fuel line port is provided with a closing means inside the tank container so as to close the flow path from the tank container into the fuel line, and the second fuel line port and the first fuel line port arranged to open into a lower portion of the tank container to receive fuel near a bottom of the tank container, in which the method of the fuel contained by the tank container is changed from the first fuel to a second fuel, the method comprising at least steps of:
   a) Emptying the tank container from the first fuel,
   b) Opening a manhole of the tank container,
   c) Closing or maintaining closed the port of the first fuel line with the closing means inside the tank container,
   d) Removing the closing means from or maintaining open a port of the second fuel line inside the tank container,
   e) Closing the manhole, f) Feeding a second fuel from a second filling system into the tank container, g) Feeding the second fuel from the tank container via the second fuel line into an engine.

15. A method operating the tank container of the marine vessel according to claim 14, comprising a further step of cleaning internal surfaces of the tank container.

16. A fuel tank arrangement of a marine vessel comprising:
    a tank container configured to store or contain a first fuel or a second fuel in the tank container, a first fuel line comprising a first fuel line port opening into the tank container so as to provide a flow path exclusively for a first fuel, and
    a second fuel line comprising a second fuel line port opening into the tank container so as to provide a flow path exclusively for a second fuel, in which the first fuel line port is provided with a closing means inside the tank container so as to close the flow path from the tank container into the first fuel line, and the second fuel line port and the first fuel line port are arranged to open into a lower portion of the tank container to receive fuel near a bottom of the tank container, wherein the second fuel line port is arranged to open into the container for introduction of the fuel from the tank container into an engine and the closing means are arranged into the first fuel line port of the first fuel line.

17. A fuel tank arrangement according to claim 16, wherein the closing means are arranged into a spray nozzle of the first fuel line.

18. A fuel tank arrangement according to claim 16, wherein a spray nozzle is replaced by the closing means and the closing means is arranged into a port of a conduit.

19. A fuel tank arrangement according to claim 16, wherein the spray nozzle is a first spray nozzle of a plurality of spray nozzles and the plurality of spray nozzles are replaced by the closing means and the closing means is arranged into a port of a conduit.

20. A fuel tank arrangement of a marine vessel comprising:
    a tank container configured to store or contain a first fuel or a second fuel in the tank container, a first fuel line comprising a first fuel line port opening into the tank container so as to provide a flow path exclusively for a first fuel, and
    a second fuel line comprising a second fuel line port opening into the tank container so as to provide a flow path exclusively for a second fuel, in which the first fuel line port or the second fuel line port is provided with a closing means inside the tank container so as to close the flow path from the tank container into the fuel line, and the second fuel line port and the first fuel line port are arranged to open into a lower portion of the tank container to receive fuel near a bottom of the tank container, wherein the closing means correspondingly threads in the first fuel line port of the first fuel line has a threaded structure and another closing means correspondingly threads the second fuel line port of the second fuel line has a threaded structure so as to close the flow communication from the tank container into an engine.

* * * * *